United States Patent Office 3,845,136
Patented Oct. 29, 1974

3,845,136
SELECTIVE OXIDATION OF CARBALKOXY-1,3-INDANEDIONE SALTS
Alan E. Pierce, 3316 Brookview Road,
Rockford, Ill. 61107
No Drawing. Filed May 3, 1971, Ser. No. 139,958
Int. Cl. C07c 49/82
U.S. Cl. 260—590
24 Claims

ABSTRACT OF THE DISCLOSURE

Ninhydrin is illustrated as being prepared by selectively oxidizing an alkali metal or alkaline earth metal salt of a 2-carbalkoxy-1,3-indanedione. The selective oxidation is accomplished with the use of a dialkyl sulfoxide in combination with bromine, hydrogen bromide, or hydrogen chloride. Preferably, the reaction is also accomplished in the presence of an organic acid and/or a small amount of water. In addition, it is disclosed that especially pure products can be obtained in very high yields by employing liquid-liquid extraction to separate the reaction mixture from undesirable impurities and reaction by-products.

BACKGROUND OF THE INVENTION

The present invention relates to a process for selectively oxidizing the carbon atom in position 2 of a 2-carbalkoxy-1,3-indanedione and, more particularly, to an improved process for the preparation of ninhydrin.

The use of ninhydrin for the detection of amino acids and related groups in analytical applications is becoming widespread. As such, there is an ever increasing need for processes for preparing ninhydrin which are economically attractive and yield ninhydrin in a very pure form.

While many processes for the preparation of ninhydrin are available, by and large the known processes are either expensive or do not yield ninhydrin in a desirably pure form. Perhaps the best known process for preparing ninhydrin is that described by Teeters and Shriner in the Journal of the American Chemical Society (1933, 55 3026). In its fundamental aspects, this method involves the oxidation of 1,3-indanedione with selenium dioxide. The high cost associated with the starting reactants of this method, and particularly selenium dioxide, and the relatively low yields obtained diminish the commercial attractiveness of the Teeters and Shriner method.

Other methods for preparing ninhydrin are described in Schipper (U.S. Pat. 3,385,694), Schipper et al. (U.S. Pat. 3,435,064) and Schipper et al. (Tetrahedron Letters #59, 6201, 1968). Therein, it is suggested that a compound containing an activated methylene group such as 1,3-indanedione can be directly oxidized with a dialkyl sulfoxide in the presence of a halogen or hydrogen halide to yield the corresponding carbonyl compound. As opposed to the method disclosed by Kornblum et al., Journal of American Chemical Society, (1957, 79 6562) which suggests that dimethyl sulfoxide can be used to oxidize an activated methylene compound which has been halogenated, the Schipper patents and article suggest that the carbonyl compounds can be directly produced in a single operation. The reactive features of a dialkyl sulfoxide such as dimethyl sulfoxide are also discussed in "Organic Sulfur Compounds," N. Kharasch, Ed. 1961, pp. 170–176.

While the methods disclosed by the Schipper patents and Kornblum et al. can be used to prepare ninhydrin, they are somewhat unattractive since a relatively expensive starting material, namely, the activated methylene compounds of the Schipper patents or the halogenated compounds of Kornblum et al., must be used. In addition, without considerable process refinement, these disclosed methods do not provide a highly pure product with an accompanying high yield.

OBJECTS OF THE PRESENT INVENTION

Accordingly, it is a principal object of the present invention to provide a process for preparing an oxidized 1,3-indanedione, such as ninhydrin, in a manner whereby good product yield and purity are obtained and wherein inexpensive starting materials are employed. A further object is to provide such a process wherein mild reaction conditions are used.

A more specific object is to provide a process for preparing an oxidized 2,3-indanedione wherein oxidation can be accomplished with an inexpensive dialkyl sulfoxide, but which does not employ, as an additional starting reactant, an activated methylene compound.

A further object is to provide a process having the desirable characteristics identified in the foregoing objects which can be accomplished in a single operation. Additional, and more specific objects reside in providing a new process wherein exceptionally high yields can be obtained, and wherein the oxidized product can be recovered in unexpectedly pure form.

Still a further object is to provide a process wherein oxidation in the manner above discussed can be rapidly accomplished.

Additional objects and advantages of the present invention will become apparent upon reading the following detailed description of the invention.

SUMMARY OF THE INVENTION

Briefly stated, the process of the present invention involves the selective oxidation of a distinctive 1,3-indanedione; namely, an alkali metal or alkaline earth metal salt of a 2-carbalkoxy-1,3-indanedione. This distinctive starting reactant can be inexpensively prepared by the simple condensation of a dialkyl phthalate and an ester of acetic acid in the presence of an alkali or alkaline earth metal or alkoxide. (Wislicenus, Ann. 246, p. 349 (1888); Experiments in Organic Chemistry, Fieser, pub. by Heath, p. 124 (1955), Teeters and Shriner, supra.) As will be discussed in detail, selective oxidation of the starting reagent can be accomplished with the use of a dialkyl sulfoxide in combination with bromine, hydrogen bromide, or hydrogen chloride.

In accordance with a preferred aspect of the present invention, the oxidation reaction is accomplished in the presence of an organic acid. The presence of such an acid unexpectedly shortens the necessary reaction time and can increase the yield. A further preferred feature of the present invention involves the use of a hydrated starting reactant or the introduction of a little water. Such use is accomplished by a surprising increase in product yield.

A still further aspect of the invention involves the use of liquid-liquid extraction to separate the reaction mixtures from undesirable impurities and reaction by-products. By using liquid-liquid extraction in accordance with the present invention, especially pure products can be obtained in very high yields.

DESCRIPTION OF PREFERRED EMBODIMENTS

While the invention will be described in connection with preferred embodiments, it is to be understood that the invention is not to be limited to those embodiments. On the contrary, all alternatives, modifications, and equivalents as can be included within the scope and spirit of the invention defined in the appended claims are intended to be covered.

For example, while the present invention will be particularly described with respect to the preparation of ninhydrin wherein the starting reactant is an unsubstituted 2-carbalkoxy-1,3-indanedione salt, it is to be understood that such salts containing substituents on the benzene ring which do not adversely affect the desirable features of the reaction process of the present invention can also be used. In this respect, while the salt of an unsubstituted carbalkoxy-1,3-indanedione is used for the preparation of ninhydrin, substituted carbalkoxy-1,3-indanedione salts can also be employed as the starting reagent where oxidized compounds other than specifically ninhydrin are desired. Examples of such substituted salts include the following: (1) salts wherein the benzene ring contains one or more hydrocarbon substituents either open chain or cyclic, e.g., 3-methyl-, 4-methyl-, tetraphenyl-, benz[f]-, etc. (2) salts wherein the benzene ring contains one or more halogen substituents, e.g., 4-bromo-, 4-chloro-, tetrabromo-, tetrachloro-, tetraiodo-, etc. (3) salts wherein the benzene ring contains a nitro substituent, e.g., 3-nitro-, 4-nitro-, etc. (4) salts wherein the benzene ring contains an acid substituent, e.g., 4-carboxy-, 4-sulfo-, etc.

(a) The Distinctive Starting Reactant

The distinctive starting reactant employed in the process of the present invention is an alkali metal or alkaline earth metal salt of a 2-carbalkoxy-1,3-indanedione and can be represented by the following structural formula:

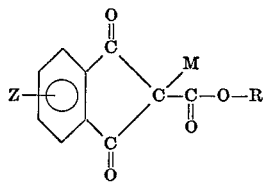

wherein M is an alkali metal or alkaline earth metal; R is an alkyl group; and Z represents substituents, when such are present, on the benzene ring.

While a 2-carbalkoxy-1,3-indanedione salt may be represented by other structures tautomeric with the one depicted such as one or more enol structures, it is to be understood that the present invention is not to be limited by or to that one structure, but simply that this structure is a convenient one to use for understanding that embodiment of the invention described herein.

Concerning the alkali metal or alkaline earth metal, M, it is believed that indanediones useful herein can be prepared with any alkali metal or alkaline earth metal; however, the more commonly available species such as calcium, barium, sodium and potassium, are preferred. Due to its inexpensiveness, sodium is especially preferred.

The particular alkyl group, R, present in the carbalkoxy moiety of the illustrated 1,3-indanedione is not particularly critical. Alkyl groups containing about 1–10 carbon atoms are generally useful, and representative examples of such include the following: straight chain alkyls such as methyl, ethyl, propyl, decyl, as well as branched chain alkyls such as 2-ethylhexyl and 2-butyl. Straight chain alkyls containing less than about five carbon atoms are especially useful since their corresponding acetates which are employed to form the 1,3-indanedione are readily commercially available. The alkali metal or alkaline earth metal salt of carbethoxy-1,3-indanedione wherein R is an ethyl group is particularly preferred.

The particularly useful substituents, Z, on the benzene ring of the illustrated structure have been previously identified. When ninhydrin is to be prepared, no Z substituents are present.

(b) Oxidation of Distinctive Starting Reactant

In accordance with the present invention, the selective oxidation of the carbon atom in position 2 of the above described 1,3-indanedione salts can be accomplished in several fashions. The reaction can be carried out in two distinct steps involving initial bromination of the salt at position 2 and, thereafter, adding a dialkyl sulfoxide to the brominated compound to accomplish oxidation. Alternatively, the distinctive 1,3-indanedione salt can be initially dissolved in a dialkyl sulfoxide followed by the addition of elemental bromine or hydrogen halide, i.e., a single operation.

In accomplishing the oxidation reaction using the distinctive starting reactant by either of the routes described above (the two distinct steps or the single operation), bromine must be employed when it is desired to use an elemental halogen. If a hydrogen halide is employed, either hydrogen chloride or hydrogen bromide are useful, though better yields can be obtained with the latter. Regarding using dialkyl sulfoxides, the lower dialkyl sulfoxides, e.g., dialkyl sulfoxides such as dimethyl and dibutyl wherein the alkyl group contains about 1–4 carbon atoms, are generally employed. Dimethyl sulfoxide (DMSO) is particularly preferred due to its low cost, availability, and the high yields obtained therewith.

Where oxidation according to the present invention is accomplished by initially halogenating a 1,3-indanedione salt and thereafter adding a dialkyl sulfoxide (two distinct steps), the 1,3-indanedione salt is dissolved or suspended in a solvent followed by addition of bromine to the solution. Since bromination of the indanedione salt is accompanied by some heat evolution, the bromine is generally added over about half an hour to the solution with cooling so as to avoid a rapid rise in temperature. In order to obtain complete bromination of the starting reactant, bromine should be added to the reaction solution in an equimolar amount.

A variety of solvents are useful in accomplishing the above described bromination reaction. The solvent, of course, should preferably dissolve the 1,3-indanedione salt starting reactant and should preferably also be a solvent for the brominated product. Among others, suitable solvents include organic acids such as acetic acid, formic acid, etc., and inert liquids such as organic esters such as ethyl acetate, isopropyl acetate, etc., ethers such as dioxane, 1,2-dimethoxyethane, etc., hydrocarbons and halogenated hydrocarbons such as heptane, chloroform, methylene chloride, etc. and other available solvents such as acetonitrile, etc. The amount of solvent used is not particularly important. When the reaction is run on a commercial basis, the use of excess quantities of solvents is avoided in order to keep the batch size to a minimum.

After bromination in the manner described above, oxidation is accomplished by adding the dialkyl sulfoxide to the reaction solution containing the brominated 2-carbalkoxy-1,3-indanedione. To maximize the reaction rate and yield, the dialkyl sulfoxide is usually added in a large excess, e.g., at least about eight times and preferably at least about fourteen times the molar amount of the starting reactant salt. Reaction with the sulfoxide proceeds at temperatures of about 30° C. to 120° C., though the reaction is preferably accomplished at a temperature of about 70° C.–90° C., and under such conditions ordinarily can be accomplished in about 1.5–3 hours, particularly when an organic acid solvent such as acetic acid or formic acid is used. In order to control the oxidation reaction temperature, the dialkyl sulfide which is formed as a reaction product should be at least partially distilled off during the reaction. When an organic acid, methylene chloride, or dioxane are employed as the solvents, the end of the reaction is generally indicated by a thickening of the reaction mixture and the cessation of dialkyl sulfide distillation.

Turning now to that aspect of the present invention wherein the carbalkoxy-1,3-indanedione salt is initially dissolved in a dialkyl sulfoxide followed by the addition of bromine or a hydrogen halide (the single operation), a large excess of dialkyl sulfoxide is again used. Solvents such as above-described with respect to the two distinct step operations can also be present. After solution of the indanedione salt in the sulfoxide has been effected, bromine or the hydrogen halide is added to the solution once again preferably in a slow manner. During addition of bromine or the hydrogen halide, the temperature of the solution should be maintained, such as by means of independent cooling, at about 10–25° C.

The quantity of bromine or hydrohalide added to the reaction mixture is preferably about two equivalents, that is, one mole of bromine or two moles of hydrohalide, per mole of salt of 2-carbalkoxy-1,3-indanedione. While excess amounts can be used, no significant advantage is realized. Furthermore, lesser amounts of hydrohalide, e.g., just slightly above one equivalent, can be employed.

After addition of bromine or the hydrogen halide is completed, the temperature of the reaction solution should be raised to above about 25° C., and preferably to about 70–90° C. When the dialkyl sulfoxide is the sole solvent, the necessary reaction time for this embodiment of the present process is customarily about 5–10 hours. Ordinarily, no thickening of the reaction charge occurs to signal the end of the reaction and the distillation of dialkyl sulfide during the reaction does not come to a stop. However, as later discussed, when a lower organic acid such as formic or acetic acid is used as solvent along with the dialkyl sulfoxide, dialkyl sulfide distillation does cease and the necessary reaction time can be shortened appreciably, e.g., to about 2–5 hours.

(c) Recovery of Oxidized Product

The oxidized product prepared by either of the above-discussed techniques (the two distinct steps or single operation) can be recovered by any of the available conventional procedures. Thus, as described in the previously identified Schipper patents, the product can be recovered by atmospheric, sub-atmospheric, or steam distillation methods. Water can then be added to the residue of the distillation and the product thereafter recovered by crystallization. Frequently, a de-colorizing agent such as charcoal is added to the solution prior to crystallization. Also, in order to obtain a more highly purified product, impurities can be removed from the solution prior to crystallization by either direct filtration or by extraction with an organic solvent such as benzene or toluene.

Rather than direct crystallization as described above, it is frequently desirable to convert the oxidized product to its insoluble reduced form, e.g., in the case of ninhydrin, to hydrindantin, after adding water and removing the reaction impurities. The reduced product thus can be recovered directly by filtration. Reduction can be accomplished by using known reducing agents such as sodium formaldehyde sulfoxylate, sodium hypophosphite, ascorbic acid, etc. Simple subsequent oxidation of the reduced product can readily be used to convert the product back to the oxidized form. The advantage of increased product purity is generally associated with the use of this technique.

While, as indicated above, known product recovery techniques can be employed, in accordance with a preferred aspect of the present invention, a particular recovery technique which results in increased product purity can be employed. To this end, it has been found that if a halogenated hydrocarbon liquid solvent is added to the reaction charge after the remaining dialkyl sulfide and other easily volatile substances have been removed and water added, an especially pure product can be obtained from the water phase of the liquid medium by either crystillization or the aforementioned reduction-oxidation procedure.

In addition to improved product purity, it has also been found that an increase, in product recovery can be obtained using this liquid-liquid extraction technique, particularly when the dialkyl sulfoxide oxidation is accomplished in the presence of an organic acid solvent such as acetic acid or formic acid. Useful halogenated hydrocarbon solvents should be non-flammable and have a high density so that the indicated extraction can be readily accomplished on a commercial scale. Preferably, aliphatic hydrocarbons are used, examples of which include methylene chloride, ethylene, dichloride, chloroform, trichloroethane, etc.

(d) Additional Features of the Present Invention

In accordance with a preferred feature of the present invention, the oxidation reaction is carried out in the presence of about 2–2.5 moles of water per equivalent of carbalkoxy indanedione salt. Quite unexpectedly, it has been found that the use of the hydrated salt gives substantially higher yields than obtained with the anhydrous salt. Yield increases on the order of 10–25% can frequently be obtained. The salt can be used as its hydrate or the anhydrous form of the salt may be employed with the addition of water to the reaction mixture before heating. For instance, the sodium salt, whose preparation is described by Wislicenus (Ann. 1888 *246*, 347), by crystallization from water is frequently obtained as a hydrate with 2.5 molecules of water. Also, the calcium salt may be similarly obtained, as a tetrahydrate. Either of these hydrated salts is suitable for use in this invention directly.

In accordance with a still further feature of the present invention, it has been found that the presence of an organic acid during the dialkyl sulfoxide oxidation results in a significant increase in oxidation reaction rate. Acetic acid and formic acid are preferred for this purpose. However, other organic acids such as propionic acid, butyric acid and the like can also be used. Thus, as previously indicated, when the two distinct step oxidation process is accomplished using acetic acid as the solvent for the 2-carbalkoxy-1,3-indanedione salt, the reaction can be accomplished in about 1.5–3 hours.

With respect to the single operation method, it has also been found that a significant increase in the reaction rate can be obtained by using as the initial solvent for the salt a combined solvent of an organic acid and a dialkyl sulfoxide; the organic acid being present in an amount of at least about 1/3, and preferably about 1/2, of the volume of the dialkyl sulfoxide. By using the combined organic acid-dialkyl sulfoxide solvent system, the reaction rate can ordinarily be reduced to about 2–5 hours. Also, as indicated before, when such a combined solvent is employed, the oxidation reaction seems to proceed in a manner similar to that discussed with respect to the two distinct step process, i.e., rapid dialkyl sulfide distillation and a noticeable thickening of the reaction charge followed by cessation of dimethyl sulfide evolution.

The above-described use of an organic acid to increase reaction rate is particularly desirable when water is present as previously described. Ordinarily, in the absence of acid, the presence of water (either added or in hydrated form) is accompanied by a lengthening of the necessary reaction time. By accomplishing the reaction in the presence of the acid, such lengthening can be minimized.

Additionally, when an acid is employed, product recovery can be increased by using the above-discussed technique of liquid-liquid extraction with a halogenated hydrocarbon solvent. It is believed that during the reaction in the presence of acid a small amount of reduced water insoluble product (e.g., hydrindantin) is formed. If product recovery is accomplished by simple filtration, such insoluble product will be removed with the reaction impurities and lost unless subsequently separated from the impurities. By employing liquid-liquid extraction, the water insoluble hydrindantin remains in the water phase with dissolved ninhydrin while the reaction impurities are dissolved in the organic liquid phase and removed with it.

The following examples illustrate the present invention. All parts and percentages are by weight unless otherwise indicated. Temperatures are reported in ° C.

EXAMPLE I

Anhydrous sodio 2-carbethoxy-1,3-indanedione (48 g., 0.2 mole) is added in portions to 100 ml. of glacial acetic acid with stirring and cooling as 32 g. (0.2 mole) bromine is added. Dimethyl sulfoxide (200 ml., 2.8 moles)

is then added and the mixture is slowly heated and held at 80–90° until dimethyl sulfide no longer distills. About one and one-half hours is required. Aspirator vacuum is then applied to the charge to remove the remaining dimethyl sulfide and the charge cooled.

The cooled charge is mixed with two volumes of water and purified by treatment with decolorizing carbon and filtered. The resulting solution of ninhydrin is treated with a small excess of sodium formaldehyde sulfoxylate (about 15 g.). This reduces the ninhydrin present to the insoluble hydrindantin (Hyd.), which is filtered off, washed and dried. The hydrindantin is pure white and melts 250–255° C. (dec.). It is obtained in about 74% yield.

The hydrindantin is then stirred with five parts of water at about 55–60° C. and approximately a stoichiometric amount of bromine is added. The hydrindantin dissolves with the formation of ninhydrin and the solution is cooled. Most of the ninhydrin crystallizes from the solution and is filtered off, washed, and dried. The ninhydrin remaining in the filtrate is recovered as hydrindantin by the addition of sodium formaldehyde sulfoxylate as before which is then again oxidized to ninhydrin and recovered. Total yield of ninhydrin is about 95% of the originally formed hydrindantin. The recovered ninhydrin has a melting point of about 258–259° C. Schonberg and Moubasher (J. Chem. Soc. 1943, p. 71) and Regitz and Adolph (Chem. Ber. 1968, *101*, p. 3604) report ninhydrin melting points of 255° C. and 254–256° C., respectively.

EXAMPLE II

Hydrated sodio 2-carbethoxy-1,3-indanedione (197 g., 0.7 mole) is dissolved in 700 ml. dimethyl sulfoxide (9.8 moles). The solution is stirred at 11–13° as 112 g. bromine (0.7 mole) is slowly added. The solution is slowly heated and held for six hr. at 88–89° as dimethyl sulfide distills. An aliquot is removed, diluted with two volumes of water, boiled briefly to expel dimethylsulfide and extracted twice with methylene chloride. Thereafter, the charge is worked up in the same manner as the aliquot. The hydrindantin yield is 80%.

Ninhydrin can then be simply prepared from the hydrindantin so recovered by the procedure set forth in Example I. This same procedure can be used for obtaining ninhydrin from hydrindantin prepared as illustrated in the following examples.

EXAMPLE III

Hydrated sodio 2-carbethoxy-1,3-indanedione (170 g., 0.6 mole) is dissolved in 600 ml. dimethyl sulfoxide (8.4 moles) and 99 g. anhydrous hydrogen bromide (1.22 moles) is added with cooling below 35°. The solution is slowly heated and held at 88–89° for 9 hr. as dimethyl sulfide slowly distills. The charge is treated as described in Example II. The yield of hydrindantin is 76.5%.

EXAMPLE IV

Hydrated sodio 2-carbethoxy-1,3-indanedione (170 g., 0.6 mole) is dissolved in a mixture of 400 ml. glacial acetic acid and 400 ml. dimethyl sulfoxide (5.6 moles), and 98 g. of hydrogen bromide (1.2 moles) added at below 30°. The solution is stirred and heated slowly and held at 80–83° for 2 hours, at the end of which time dimethyl sulfide distillation has stopped. The charge is treated as described in Example II. The hydrindantin yield is 87%.

EXAMPLE V

The effect of the presence of lower aliphatic acids in accelerating the oxidation reaction is illustrated in the following Table 1. As used therein "HOAc" refers to acetic acid, "HOF" refers to formic acid, and "HOP" refers to propionic acid. The general procedure of Example IV is followed.

TABLE 1

| | Sodio salt anhyd., moles | Water added, moles | HBr, moles | DMSO, ml. | Organic acid used | Milliliter | Reaction Temp., degree | Reaction Time, hrs. | Hyd. yield, percent |
|---|---|---|---|---|---|---|---|---|---|
| Va | 0.4 | 0.8 | 0.8 | 375 | None | | 75–80 | 4:40 | 76.5 |
| Vb | 0.4 | 1.0 | 0.8 | 250 | HOF | 125 | 80 | 2:00 | 87.5 |
| Vc | 0.8 | 1.6 | 1.76 | 450 | HOAc | 250 | 80 | 2:00 | 81.0 |
| Vd | 0.4 | 0.8 | 0.9 | 250 | HOP | 125 | 80 | 2:20 | 71.0 |

EXAMPLE VI

In continuation of Example V, the effect of various proportions of acetic acid (HOAc) under the same conditions as described therein illustrated in Table 2.

TABLE 2

| | Sodio salt hyd., moles | Water present, moles | HBr, moles | DMSO, ml. | HOAc, ml. | HOAc, per mole | Reaction Temp., degree | Reaction Time, hrs. | Hyd. yield, percent |
|---|---|---|---|---|---|---|---|---|---|
| VIa | 0.4 | 1.0 | 0.84 | 400 | 200 | 0.5 | 85 | 4:30 | 90 |
| VIb | 0.4 | 1.0 | 0.84 | 400 | 100 | 0.25 | 90 | 5:20 | 81 |
| VIc | 0.4 | 1.0 | 0.80 | 400 | None | 0.00 | 85 | 8:00 | 68 | the solution of ninhydrin is heated with sodium formaldehyde sulfoxylate as described in Example I. The hydrindantin yield is 77%.

The main reaction charge is heated further. The evolution of dimethyl sulfide continues. After four hours

EXAMPLE VII

Table 3 illustrates the effect of various proportions of acetic acid for reactions carried out as in Example I, except VIId followed the procedure of Example II.

TABLE 3

| | Sodio salt hyd., moles | Water present, moles | Br₂, moles | DMSO, ml. | HOAc, ml. | HOAc, per mole | Reaction Temp., degree | Reaction Time, hrs. | Hyd. yield, percent |
|---|---|---|---|---|---|---|---|---|---|
| VIIa | 0.41 | 1.0 | 0.41 | 400 | 150 | 0.375 | 86 | 5:15 | 80 |
| VIIb | 0.41 | 1.0 | 0.41 | 400 | 125 | 0.313 | 86 | 6:50 | 77.5 |
| VIIc | 1.0 | 2.5 | 1.0 | 1,000 | 300 | 0.3 | 85 | 6:45 | 75 |
| VIId | 0.4 | 1.0 | 0.4 | 400 | None | 0 | 85 | 11:05 | 81 |

EXAMPLE VIII

A comparison of the use of anhydrous and hydrated ($2\frac{1}{2}H_2O$) sodio 2-carbethoxy-1,3-indanedione under various reaction conditions is illustrated in Table 4. VIIIa and VIIIb followed the procedure of Example I; VIIIc–e, Example II; and VIIIf and g, Example III.

TABLE 4

| Sodio salt | | Bromination | | DMSO, ml. | HOAc, ml. | Reaction | | Hyd. yield, percent |
| --- | --- | --- | --- | --- | --- | --- | --- | --- |
| Kind | Moles | Agent | Moles | | | Temp., degree | Time, hrs. | |
| VIIIa Anhydrous | 0.9 | Br₂ | 0.9 | 900 | 450 | 80–90 | 1:30 | 74 |
| VIIIb Hydrated | 0.4 | Br₂ | 0.42 | 400 | 200 | 80–90 | 4:00 | 81 |
| VIIIc Anhydrous | 0.2 | Br₂ | 0.19 | 250 | None | 77–85 | 4:00 | 48 |
| VIIId Hydrated | 0.4 | Br₂ | 0.4 | 400 | None | 85 | 11:00 | 81 |
| VIIIe do | 0.8 | Br₂ | 0.8 | 700 | None | 85 | 7:30 | 75 |
| VIIIf Anhydrous | 0.2 | HBr | 0.4 | 200 | 100 | 75–82 | 3:00 | 68 |
| VIIIg Hydrated | 0.4 | HBr | 0.84 | 400 | 200 | 85 | 4:00 | 90 |

EXAMPLE IX

In continuation of Example VIII, the use of varying proportions of water under two sets of reaction conditions is illustrated in Table 5. IXa and IXb followed the procedure of Example I; IXc through IXg, Example II.

TABLE 5

| | Sodio salt anhy., moles | Water added | | Bromination | | DMSO, ml. | HOAc, ml. | Reaction | | Hyd. yield, percent |
| --- | --- | --- | --- | --- | --- | --- | --- | --- | --- | --- |
| | | Moles | Moles, per mole salt | Agent | Moles | | | Temp., degree | Time, hrs. | |
| IXa | 0.4 | 1.0 | 2.5 | Br₂ | 0.4 | 400 | 200 | 81–84 | 7:00 | 76 |
| IXb | 0.4 | 0.5 | 1.25 | Br₂ | 0.4 | 400 | 200 | 82 | 4:40 | 71 |
| IXc | 0.8 | 1.2 | 1.5 | HBr | 1.68 | 500 | 200 | 80 | 2:20 | 70 |
| IXd | 0.8 | 1.6 | 2 | HBr | 1.68 | 450 | 250 | 80 | 2:15 | 81 |
| IXe | 0.8 | 1.6 | 2 | HBr | 1.76 | 450 | 250 | 80 | 2:00 | 81 |
| IXf | 0.8 | 2.0 | 2.5 | HBr | 1.68 | 450 | 250 | 80 | 2:30 | 80 |
| IXg | 0.8 | 2.4 | 3 | HBr | 1.76 | 450 | 250 | 80 | 2:30 | 72.5 |

EXAMPLE X

The procedure of Example I is repeated using the solvents indicated in Table 6 instead of acetic acid.

TABLE 6

| | Sodio salt, moles | Water present, moles | Br₂, moles | DMSO, ml. | Other solvent | Reaction | | Hyd. yield, percent |
| --- | --- | --- | --- | --- | --- | --- | --- | --- |
| | | | | | | Temp., degree | Time, hrs. | |
| Xa | 0.21 | 0.08 | 0.2 | 200 | MeCl₂ | 80–100 | 2:00 | 30 |
| Xb | 0.2 | 0 | 0.2 | 200 | Ethyl acetate | 75–90 | 1:45 | 50 |
| Xc | 0.2 | 0 | 0.2 | 200 | Acetonitrile | 85–94 | 2:00 | 48 |
| Xd | 0.2 | 0 | 0.2 | 200 | Dioxane | 88–90 | 2:00 | 57 |

EXAMPLE XI

Hydrated sodio 2-carbethoxy-1,3-indanedione (49 g., 0.17 mole) is dissolved in a mixture of 100 ml. acetic acid and 200 ml. dimethyl sulfoxide. The solution is cooled and 15 g. (0.41 mole) of hydrogen chloride is added. The resulting slurry is heated slowly and held at 75–90° for two hours. The cooled charge is diluted with water and worked up as in Example II. A 4.5% yield of hydrindantin is obtained.

EXAMPLE XII

The calcium salt of 2-carbethoxy-1,3-indanedione is prepared by adding an excess of calcium nitrate solution to a thin slurry of sodio 2-carbethoxy-1,3-indanedione in warm water. A new precipitate forms, which is filtered off, washed and dried. A sample of the intensely yellow solid is recrystallized from dilute ethanol for analysis. Calculated for the calcium salt tetrahydrate, $C_{24}H_{18}O_8Ca$: C, 52.8%; H, 4.8%; Ca, 7.3%; hydration water, 13.2%. Found. C, 52.82; H, 4.91; Ca, 7.34; loss at 105°, 13.4%.

In the manner of Example III, 47.4 g. (0.1 mole) of the above calcium salt (anhydrous form) is dissolved in a mixture of 100 ml. acetic acid, 200 ml. dimethyl sulfoxide and 7.2 g. (0.4 mole) water, treated with 32.4 g. (0.4 mole) hydrogen bromide and heated for nearly two hours at 85° until evolution of dimethyl sulfide ceases. The reaction charge is pumped on an aspirator, diluted and treated as described in Example III. The yield of hydrindantin is 83%.

EXAMPLE XIII

To illustrate the effect of purification in the work-up stage by liquid-liquid extraction using methylene chloride, an oxidation is carried out in the manner of Example IV using 0.8 mole anhydrous sodio 2-carbethoxy-1,3-indanedione and 1.6 moles hydrogen bromide in 288 g. 90% formic acid and 450 ml. dimethyl sulfoxide. After two hours heating at 80° the distillation of dimethyl sulfide ceases and that dissolved in the charge is removed by brief vacuum distillation.

The reaction charge is halved. Part A is diluted with water, extracted three times with methylene chloride, filtering from a little hydrindantin, and the aqueous portion treated with 30 g. sodium formaldehyde sulfoxylate. The combined hydrindantin yield (filtered plus that resulting from sulfoxylate treatment) is 61.7 g. Part B is diluted with water and treated directly with 30 g. sodium formaldehyde sulfoxylate. The crude hydrindantin yield is 66.9 g.

The hydrindantin obtained from each part is separately converted to ninhydrin as described in Example I, but using a mixture of bromine and chlorine. In the halogenation of the hydrindantin from Part B there is a substantial amount of insoluble material which is filtered off after the hydrindantin has all reacted and prior to cooling. In Part A there is practically no insoluble material at the end of halogenation. The results are as follows, yields being based on the amount of the sodio salt originally taken.

|   | Ninhydrin ||| Hydrindantin recovered from ninhydrin filtrate ||
|---|---|---|---|---|---|
|   | Wt., gram | M.P., °C. | Yield, percent | Wt., gram | Yield, percent |
| A | 48.2 | 258-9 | 67.8 | 8.6 | 12.0 |
| B | 43.4 | 254-6 | 61.0 | 6.4 | 8.9 |

EXAMPLE XIV

Anhydrous sodio 2-carbethoxy-1,3-indanedione (73.5 g., 0.3 mole) is mixed with a solution of 100 g. acetic acid, 300 g. di(n-propyl) sulfoxide and 10.8 g. water. Hydrogen bromide (49 g., 0.6 mole) is introduced with stirring, below 30°. The resulting slurry is heated at 80–85° C. one and one-half hours, then pumped on a water aspirator half an hour. The solid in the charge is separated and extracted with warm water. The cooled aqueous solution is extracted several times with methylene chloride and treated with 25 g. sodium formaldehyde sulfoxylate. The hydrindantin precipitate is filtered, washed and dried; weight, 21.7 g.; yield 40.5%.

While the previously discussed preferred aspects of the present invention concerning the use of liquid-liquid extraction for product recovery and accomplishing the oxidation reaction in presence of an organic acid and/or water have been specifically illustrated and described in connection with the use of an indanedione salt starting reactant, it is believed that the advantages derived from employing these preferred aspects can also be realized when other starting reactants are employed. For example, it is believed that product yield can be increased in the known processes for preparing ninhydrin using 1,3-indanedione by the addition of a small amount of water. Similarly, the necessary reaction time can be shortened and the product recovery increased through the described use of an organic acid and/or liquid-liquid extraction, respectively.

I claim as my invention:

1. In a process for selectively oxidizing the carbon atom in position 2 of a 1,3-indanedione, which is suspended or dissolved in an alkanoic organic acid containing about 1–4 carbon atoms, a dialkyl sulfoxide, an inert liquid, or mixtures thereof, comprising halogenating the 2 carbon atom of the 1,3-indanedione in the presence of $Br_2$, HBr, HCl, or mixtures thereof, and oxidizing it with a dialkyl sulfoxide; the improvement wherein the 1,3-indanedione is a 2-substituted alkali metal or alkaline earth metal salt of a 2-carbalkoxy-1,3-indanedione having about 1–10 carbon atoms in the carbalkoxy moiety thereof.

2. The process of claim 1 wherein the alkyl group of the carbalkoxy moiety of the 1,3-indanedione contains less than about 5 carbon atoms.

3. The process of claim 1 wherein the 1,3-indanedione is a sodium, potassium, calcium or barium salt of a 2-carbalkoxy-1,3-indanedione.

4. The process of claim 3 wherein the alkyl group of the carbalkoxy moiety of the 1,3-indanedione contains less than about 5 atoms.

5. The process of claim 4 wherein the 1,3-indanedione is a sodium salt of a 2-carbalkoxy-1,3-indanedione.

6. The process of claim 5 wherein the 1,3-indanedione is sodio 2-carbethoxy-1,3-indanedione and wherein the selective oxidation of the 2 carbon atom yields ninhydrin.

7. The process of claim 6 wherein the dialkyl sulfoxide is dimethyl sulfoxide and halogenation is accomplished in the presence of $Br_2$, HBr, or a mixture thereof.

8. The process of claim 1 wherein an alkanoic organic acid containing about 1–4 carbon atoms is present during oxidation.

9. The process of claim 7 wherein formic acid or acetic acid is present during oxidation.

10. The process of claim 1 wherein the 2-carbalkoxy-1,3-indanedione salt is hydrated or about 2–2.5 moles of water per equivalent of the salt is present during oxidation.

11. The process of claim 7 wherein the carbalkoxy-1,3-indanedione salt is hydrated or about 2–2.5 moles of water per equivalent of the salt is present during oxidation.

12. In a process for selectively oxidizing the carbon atom in position 2 of a 1,3-indanedione comprising dissolving the indanedione in an excess of a dialkyl sulfoxide, adding $Br_2$, HBr, HCl or mixtures thereof to the solution so formed while maintaining the temperature of the solution below about 30° C. and thereafter raising the solution temperature in order to effect oxidation; the improvement wherein the 1,3-indanedione is a 2-substituted alkali metal or alkaline earth metal salt of a 2-carbalkoxy-1,3-indanedione having about 1–10 carbon atoms in the carbalkoxy moiety thereof.

13. The process of claim 12 wherein the alkyl group of the carbalkoxy moiety of the 1,3-indanedione contains less than about 5 carbon atoms and the alkali metal or alkaline earth metal is sodium, potassium, calcium or barium.

14. The process of claim 13 wherein the 1,3-indanedione is the sodium salt of 2-carbethoxy-1,3-indanedione, the dialkyl sulfoxide is dimethyl sulfoxide and $Br_2$, HBr, or a mixture thereof is added to the solution.

15. The process of claim 14 wherein acetic acid or formic acid is present during oxidation.

16. The process of claim 14 wherein the carbalkoxy-1,3-indanedione salt is hydrated or about 2–2.5 moles of water per equivalent of the salt is present during oxidation.

17. The process of claim 16 wherein acetic acid or formic acid are present during oxidation.

18. In the process of selectively oxidizing the carbon atom in position 2 of a 1,3-indanedione comprising (1) dissolving or suspending the indanedione in an alkanoic organic acid containing about 1–4 carbon atoms, an inert liquid selected from organic esters, ethers, hydrocarbons, halogenated hydrocarbons, and acetonitrile, or mixtures thereof, (2) adding elemental bromine to the liquid and halogenating the indanedione at the carbon atom in position 2, and (3) adding a dialkyl sulfoxide to the liquid and oxidizing the halogenated indanedione, the improvement wherein the 1,3-indanedione is a 2-substituted alkali metal or alkaline earth metal salt of a 2-carbalkoxy-1,3-indanedione having about 1–10 carbon atoms in the carbalkoxy moiety thereof.

19. The process of claim 18 wherein the 1,3-indanedione is dissolved in acetic acid or formic acid.

20. The process of claim 18 wherein the alkyl group of the carbalkoxy moiety of the 1,3-indanedione contains less than about 5 carbon atoms and the alkali metal or alkaline earth metal is sodium, potassium, calcium or barium.

21. The process of claim 20 wherein the 1,3-indanedione is the sodium salt of 2-carbethoxy-1,3-indanedione and the dialkyl sulfoxide is dimethyl sulfoxide.

22. The process of claim 21 wherein the 2-carbalkoxy-1,3-indanedione salt is hydrated or about 2–2.5 moles of water per equivalent of the salt is present during oxidation.

23. The process of claim 22 wherein the 1,3-indanedione is dissolved in acetic acid or formic acid.

24. The process of claim 11 wherein formic acid or acetic acid is present during oxidation.

References Cited
UNITED STATES PATENTS

| 3,366,690 | 1/1968 | Wood | 260—590 |
| 3,419,616 | 12/1968 | Wood | 260—590 |
| 3,165,554 | 1/1965 | Wineland | 260—596 X |

(Other references on following page)

UNITED STATES PATENTS

| | | | |
|---|---|---|---|
| 2,643,269 | 6/1953 | Augustine | 260—590 |
| 3,385,894 | 5/1968 | Schipper | 260—590 |
| 3,435,064 | 3/1969 | Schipper et al. | 260—590 X |

OTHER REFERENCES

N. Kharasch: *Organic Sulfur Compounds*, pp. 154–76 (1961).

S. T. Yoffe et al.: Tetrahedron Letters, *1965* (10), pp. 593–600.

D. Leuhrs et al.: Inorganic Chemistry, *4* (12), 1739–41 (1965).

DANIEL D. HORWITZ, Primary Examiner